(12) United States Patent
Homer et al.

(10) Patent No.: US 6,823,631 B2
(45) Date of Patent: Nov. 30, 2004

(54) ANIMAL GUARD INSTALLATION BRACKET

(76) Inventors: Joseph Homer, 677 E. Eblin St., La Grange, TX (US) 78945; Carlan Sweatman, 123 Oak River Dr., Cedar Creek, TX (US) 78612-3030

(*) Notice: Subject to any disclaimer, the term of this patent is extended or adjusted under 35 U.S.C. 154(b) by 0 days.

(21) Appl. No.: 10/225,633

(22) Filed: Aug. 22, 2002

(65) Prior Publication Data

US 2003/0046882 A1 Mar. 13, 2003

Related U.S. Application Data

(60) Provisional application No. 60/318,388, filed on Sep. 10, 2001.

(51) Int. Cl.[7] .............................................. H01B 17/00
(52) U.S. Cl. ...................... 52/101; 52/741.1; 52/715; 174/139; 174/40 R; 174/40 CC; 174/135
(58) Field of Search ................................ 52/101, 741.1, 52/715; 43/1; 119/713, 903; 174/139, 140 R, 5 R, 40 R, 40 CC, 135

(56) References Cited

U.S. PATENT DOCUMENTS

| | | | | |
|---|---|---|---|---|
| 2,840,631 A | * | 6/1958 | Marcroft | 174/140 R |
| 3,192,311 A | * | 6/1965 | Weinfurt | 174/139 |
| 3,613,683 A | * | 10/1971 | Kees et al. | 606/142 |
| 3,824,676 A | * | 7/1974 | Ebert | 29/450 |
| 4,201,883 A | * | 5/1980 | Shepherd | 174/139 |
| 5,648,641 A | * | 7/1997 | Guthrie | 174/139 |
| 5,650,594 A | * | 7/1997 | Urnovitz | 174/139 |
| 5,864,096 A | * | 1/1999 | Williams et al. | 174/139 |
| 6,534,719 B2 | * | 3/2003 | Wright | 174/139 |
| 2003/0015330 A1 | * | 1/2003 | Wood et al. | 174/5 R |

* cited by examiner

Primary Examiner—Brian E. Glessner
(74) Attorney, Agent, or Firm—Darcell Walker

(57) ABSTRACT

The present invention is a device for use to install and remove animal guards from bushings, surge arresters and insulators on electrical equipment. The device attaches one end to the receiving end of an animal guard and the opposite end to a telescope stick, hot stick or other suitable sick to support device. This device may be used to install animal guard devices while remaining at ground elevation or at an evaluation above the ground.

14 Claims, 6 Drawing Sheets

ANIMAL GUARD INSTALLATION BRACKET

CROSS REFERENCE TO OTHER APPLICATION

This application claims priority of a previously filed patent application Ser. No. 60/318,388 filed on Sep. 10, 2001, the contents of which are incorporated herein by reference.

FIELD OF THE INVENTION

This invention relates to animal guards for use on bushings and insulators for high voltage lines such as those used on electrical transformers, circuit breakers, capacitors, and other electrical equipment and in particular to a bracket used during the installation of these animal guards on the bushings and insulators for such high voltage lines.

BACKGROUND OF THE INVENTION

Equipment such as transformers, circuit breakers, capacitors, fused cutouts, conductor insulators, underground cable terminators and other equipment utilizing insulators is commonly used in electrical power supply systems. Such equipment is frequently damaged or even destroyed if an animal contacts a ground source and an energized conductor or terminal. This usually causes a power outage with the resultant disruption of service to numerous customers.

Several prior art devices, such as those disclosed in U.S. Pat. Nos. 2,840,631, 3,192,311, and 4,201,883 have attempted to solve this problem by providing physical or electrical barriers to discourage or prevent animals from coming into contact with the equipment. However, the prior art devices do not eliminate tracking or flashover because of inadequate gaps, which still results in the destruction of the device and equipment. Also, in none of the prior art devices can installation or removal of the insulator guard take place while the equipment is energized. This results in outage time during installation or removal of the guard.

One device used to protect electrical equipment against animals is described in U.S. Pat. No. 5,648,641 to James Guthrie. This device discloses an electro-statically charged animal barrier for the protection of electrical bushings and other types of electrical equipment. This animal barrier utilizes a plurality of radically extending spokes fabricated from conducting material. These spokes may be secured within the bushing material itself, or may be carried by an annular support of non-conducting material, which is removably secured about the longitudinal axis of the bushing. The inner side of the annular support includes a number of small projections to space the support from the bushing so as to provide a passageway for condensation and rainfall. Current flow through the conductor within the bushing creates an electrostatic charge on the spokes sufficient to discourage an animal from attempting to climb around the barrier. The contents of this patent are incorporated herein by reference.

The general procedure used by utility personnel to install the animal guard device, described in U.S. Pat. No. 5,648,641, is one of two methods. If the equipment where the guard will be installed is accessible, then a bucket truck and a hot are used to install the guard on the electrical equipment. The second method is used when the equipment is not accessible. Utility personnel have to put on climbing gear and extra personal protection equipment for the installation. The personnel then have to carry the animal guard and hot stick used to install the guard to the location where the installation is to occur. Sometimes the distance may need to be covered more than once. Once at the installation location, personnel would then climb the pole and proceed to install the animal guard.

There are several disadvantages associated with these methods the current guard installation methods do not solve. One disadvantage is the safety of the utility personnel. Accidents can occur while climbing the poles. Still another disadvantage is the inefficient use of equipment such as a bucket truck to transport personnel to the level of the equipment to install the animal guards.

Finally, the current installation methods do not provide solutions to the problem of allowing personnel to install the animal guards on the electrical equipment from ground level. The present invention is a device that solves these problems by allowing personnel to perform an animal guard installation from the safety of ground level. This installation procedure also makes more efficient use of vehicle equipment. Bucket trucks can be dispatched to other more critical work locations. Extra personal protection equipment is not needed by personnel while at ground level because they are far removed from the electrically charged equipment.

SUMMARY OF THE INVENTION

It is an objective of this invention to provide a device that can enhance the safety of utility personnel by allowing personnel to install animal guards from ground elevation, as opposed to personnel being exposed to energized equipment.

It is a second objective of this invention to provide an efficient use of time, manpower and equipment when installing animal guard devices on utility poles.

It is a third objective of this invention to provide an economical device that is affordable to utility providers and a device that is easy to manufacture.

It is a fourth objective of this invention to provide a new, improved and efficient method for installing animal guards.

The present invention provides an improved, economical and efficient device for installing and removing animal guards while standing at ground level.

To attain this objective, the device of the present invention has one end that attaches to the animal guard and an opposite end that attaches to a hot stick, telescope stick or other insulated stick. When properly attached to both the animal guard and the installation stick, the device of the present invention extends the animal guard in an outward and primarily horizontal position from the installation stick. Using the hot-stick, telescope stick or some other insulated stick, the animal guard is lifted above ground and to the level of the electrical equipment bushing, surge arrester or insulator where the guard is to be installed. At this point, the animal is installed around the electrical equipment as described in U.S. Pat. No. 5,648,641. The telescope stick, hot stick or other insulated stick along with the invention is detached from the animal guard and brought back to ground level.

The device of the present invention has a notch that can engage a stick device that is used during the animal guard installation process to lift the guard to the desired installation position. This stick device could be a common device used by electrical personnel such as a "hot stick", "telescope stick" or other insulated stick. The present invention can engage the animal at multiple points. The two primary engagement points of the animal guard are the flanges and the spring. Notches are used to connect the bracket to the animal guard. The spring of the animal guard rests on a metal tab on the base of the animal guard to the bracket. The extended members engage the flanges portions of the animal guard. The extended members stabilize and support the animal guard in order to keep the animal guard from falling off the bracket. The bracket device of the present invention also prevents the base of the animal guard from rotating during this process. When the utility personnel have raised the animal guard to the desired location, the animal guard is installed onto the equipment through the open area of the guard. As the guard is installed, it disengages from the bracket device of the present invention. Utility personnel skilled in electrical equipment installation will have an appreciation for the simplicity, usefulness and ease of construction of this device.

DETAILED DESCRIPTION OF THE INVENTION

Figure 1:
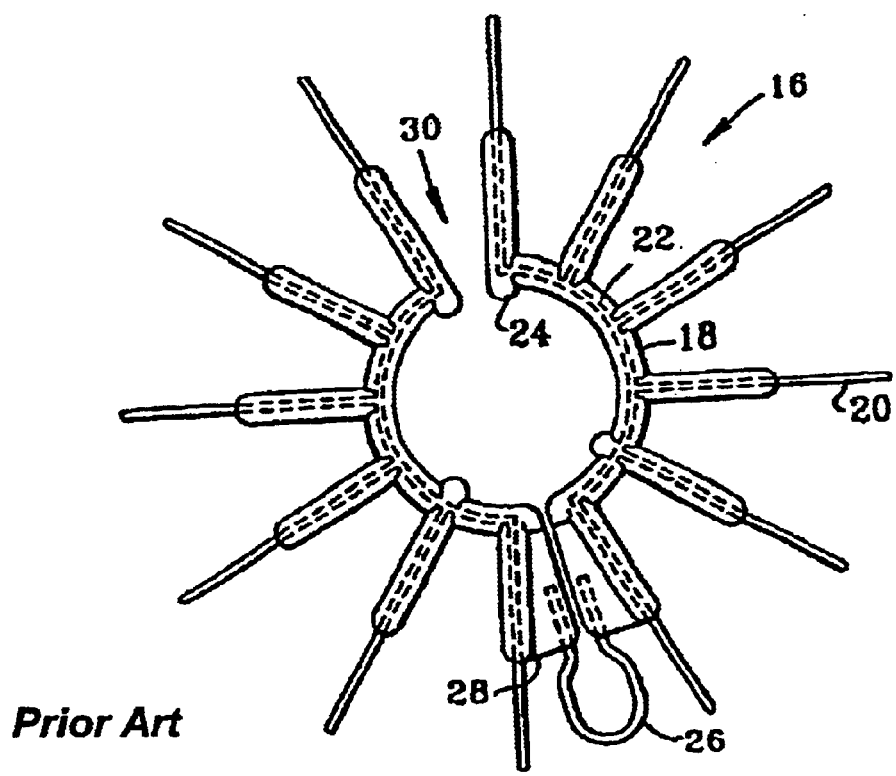
FIG. 1 is a diagram of an electrostatic animal guard for installation on electrical equipment.

The present invention enables utility company personnel to install animal guards on electrical equipment bushings, insulators and surge arresters while standing at ground level. In particular the invention is design to install the animal guard shown in FIG. 1. This device is described in U.S. Pat. No. 5,648,641 to Guthrie. As shown in FIG. 1, one embodiment of a barrier 16 is shown, comprised of an annular base 18, fabricated from an insulating material such as rubber, epoxy, silicone, vinyl, or the like, which supports a plurality of spokes 20 extending radially therefrom in a spaced apart relationship. As clearly seen, the insulating material of the annular base 18 preferably extends outward along each of the spokes 20 for a short distance for increased strength. Extending radially inwardly from the inner side of the annular base 18 is a plurality of short stubs 24, also fabricated from the same insulating material as the base 18.

These stubs 24 function to displace the annular base 18 slightly away from the bushing 12 so as to allow drainage of condensation, rainfall, and other moisture buildups.

In the particular embodiment of the animal guard depicted in FIG. 1, the annular base 18 can be seen to be two separate semi-circular sections held together by a spring 26, which extends into flanges 28 of insulating material protruding from an end insulation extension on each section. A small gap 30 is left between the ends of the semi-circular sections opposite the spring 26 to facilitate installing the device onto the bushing 12 and removing it. In a further embodiment, utilizing an insulating material of sufficient resiliency, the annular base 18 is a continuous ring but for gap 30, and the spring 26 is not utilized. The spokes 20 extend radially from a conductor 22 enclosed within the insulating material of the annular base 18 as shown by the dashed lines. This gives the device greater strength, but is not required. Other embodiments of the invention have none of the spokes 20 electrically connected or utilize various combinations of the spokes 20 electrically connected, depending on particular electrostatic requirements for the invention. At the present time, it appears that having adjacent pairs of spokes 20 electrically connected within the annular base 18 of insulating material provides the best electrostatic field for warding off animals.

The device of the present invention is an animal guard installation bracket. As previously slated, the device has a notch that can contain a stick device that is used during the animal guard installation process to lift the guard to the desired installation position. This stick device could be a common device used by electrical personnel such as a "hot stick", "telescope stick" or other insulated stick. The stick device is connected to the bracket of the present invention.

Figure 2:
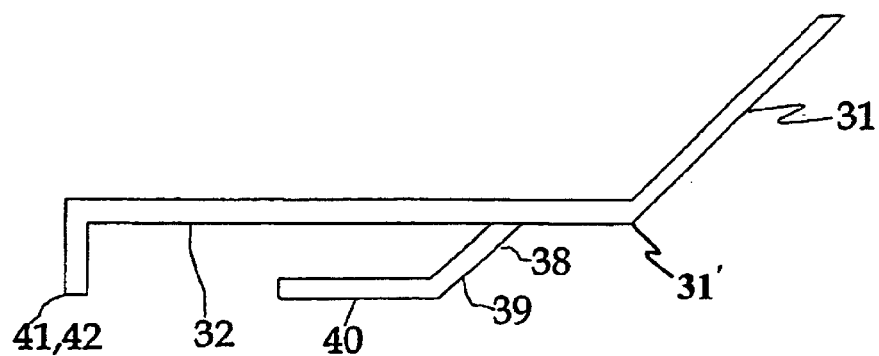
FIGS. 2 and 2a are side views of alternate embodiments of the installation bracket device of the present invention used to install and remove animal guards from electrical equipment, insulators and surge arresters while standing at ground level.

Referring to FIG. 2, the bracket of the present invention has four main sections. The first section is the pole engager 31, which engages the pole device that will be used to lift the animal guard and bracket to the installation location. As shown this pole engager 31 is angled relative to a base frame section 32. The angle of the pole engagement member can vary and can be in an upward or downward direction relative to the frame. The present invention can have a hinge 31' to serve as a joint between the pole engager and the base frame. This hinge will facilitate the adjustment of the angle of the pole engager. This engagement member contains a notch opening 33 that engages the pole. The pole engager can have tapered sides 34.

Figure 2A:
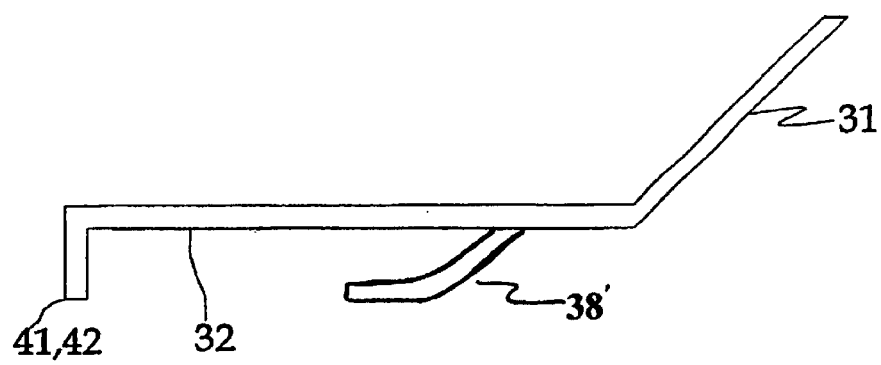
Figure 3:
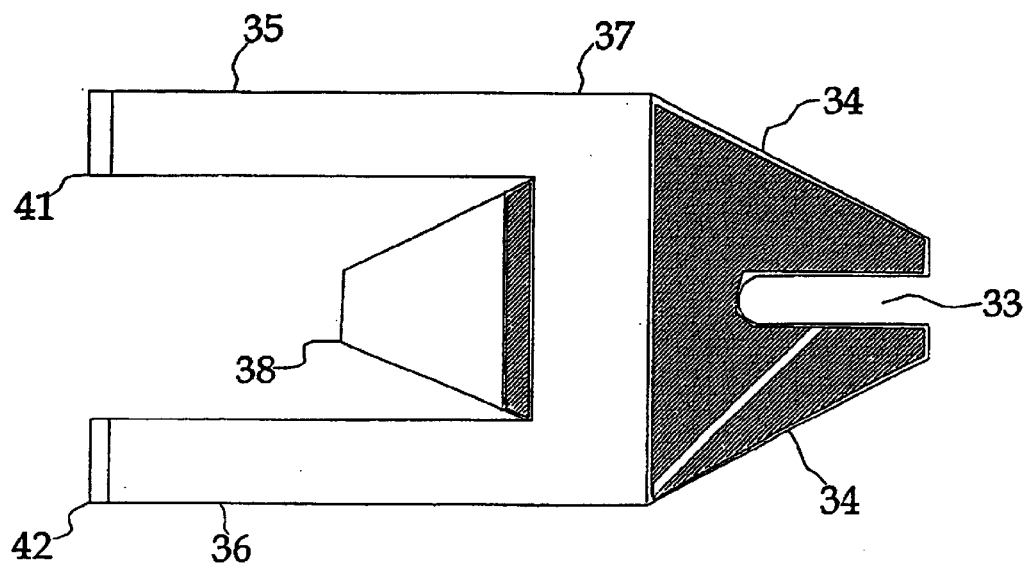
FIG. 3 is a top view of the device of the present invention.
Figure 4:
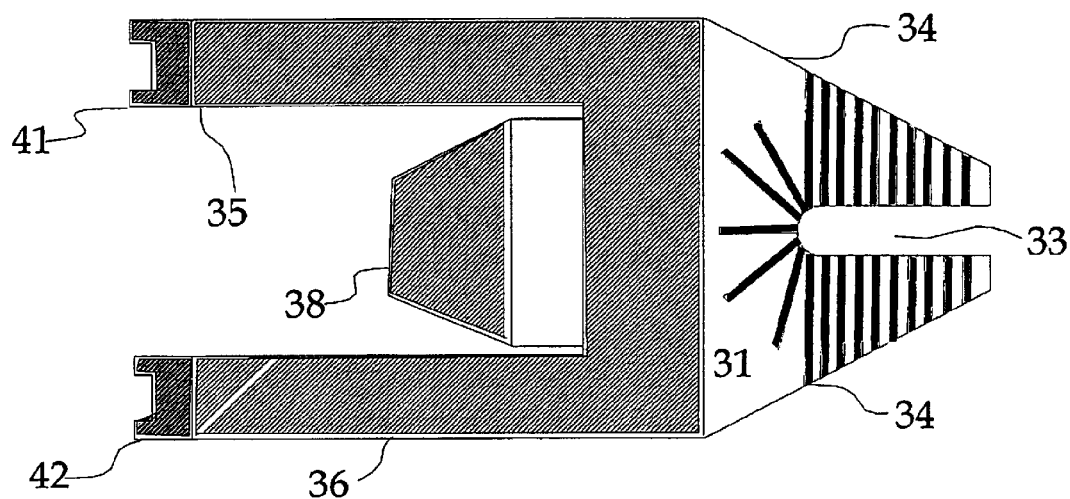
FIG. 4 is a front view of the device of the present invention.
Figure 5:
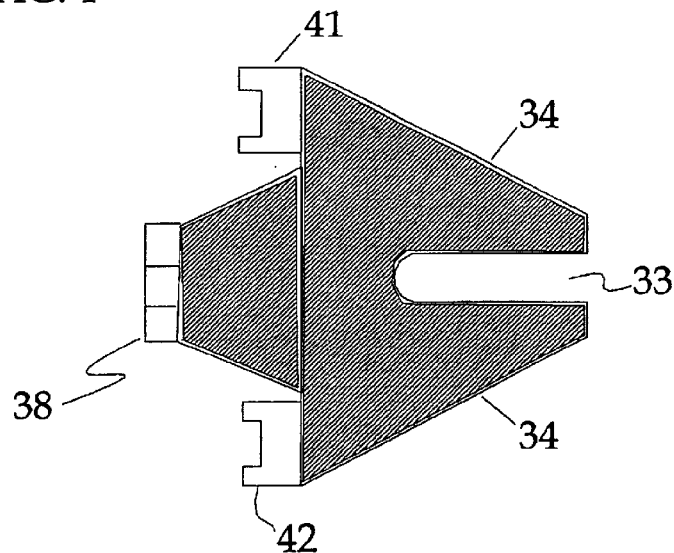
FIG. 5 is an alternate view of the device of the present invention.

As shown in FIG. 3, the frame section 32 comprises two parallel extending bracket arms 35 and 36. The bracket arms extend to engage the flange members 28 of the animal guard in FIG. 1. The frame also has bridge section 37 that connects to the two arms and also connects to the pole engager section 31. The tower tongue section 38 extends from the bridge in a downward angled direction. As shown, the tongue section can have two distinct sections 39 and 40. Section 39 extends downward from the bridge. Section 40 extends in direction that is parallel to the arms 35 and 36. As shown in FIG. 2a, the tongue section can in the alternative be one section 38' that extends down from the bridge and outward in a curved manner. The lower tongue section engages the spring member 26 of the animal guard. Each bracket arm has an end section that extends in a generally perpendicular direction to the bracket arms. These end sections 41 and 42 also engage the flange member 28 of the animal guard. FIG. 4 shows a bottom view of the bracket of the present invention. FIG. 5 shows a top view of an alternate embodiment of the present invention.

FIG. 6 shows a configuration wherein the bracket of the present is connected to both the lift pole and the animal guard. As shown, universal notch is connected to the end of the lift pole or hot stick. Notches can also be used to connect the bracket to the animal guard. The metal tab/tongue 38 on the bracket connects the spring of the animal guard to the bracket. The bracket arms 35 and 36 engage the animal guard flanges 28 and support the animal guard when the guard is lifted during the installation process. The bracket arm ends also engage the flanges 28. The bracket arms and ends prevent the base of the animal guard from rotating during this lifting process. When properly connected, the metal tab 38 engages the spring of the animal guard 26. Because of the design of the animal guard, the engagement point of the metal tab and spring create a pivot point. The weight of the animal guard would cause the guard to pivot off of the metal tab/tongue. The bracket arms 35 and 36 and end extensions 41 and 42 serve to hold the bracket in place during the installation process and prevent the rotation of the animal guard 26. However because of gravitational forces pulling on the animal guard in a downward direction, the flange section is forced upward against the bracket arms. The downward extending ends hold the flange against the bracket arms and further secure the engagement of the bracket with the animal guard. FIG. 6b is an illustration of the lift pole, installation bracket and alternate embodiment of the animal guard. In this embodiment, the installation bracket attaches to the animal guard in the same manner as the animal guard in FIG. 6a.

Figure 6A:
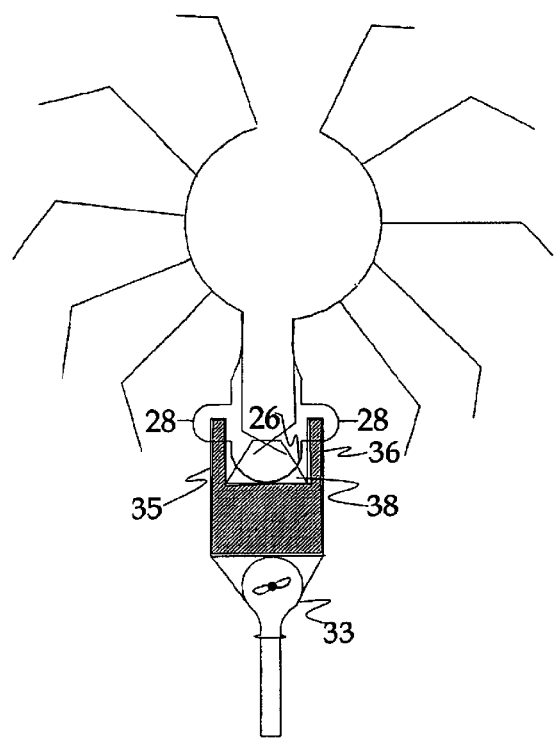
FIG. 6a is an illustration of the installation bracket of the present invention engaging both the animal guard and the installation stick device prior to installation of the animal guard.
Figure 6B:
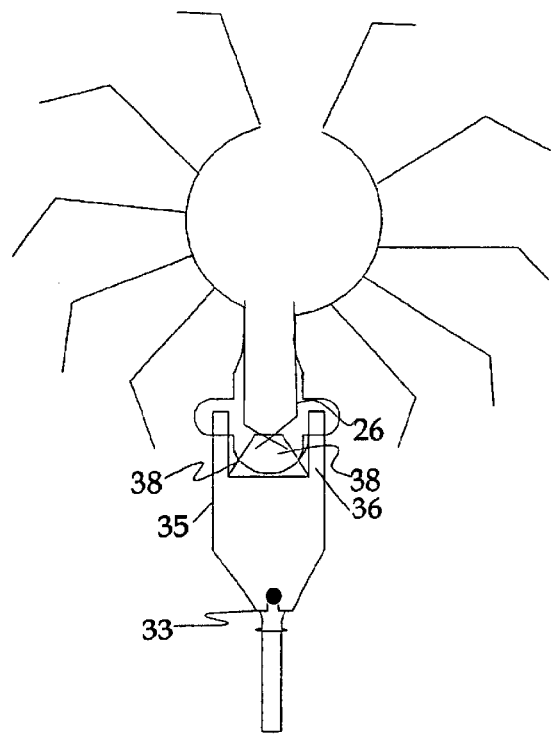
FIG. 6b is an alternate illustration of the installation bracket of the present invention engaging both the animal guard and the installation stick device prior to installation of the animal guard.
Figure 6C:
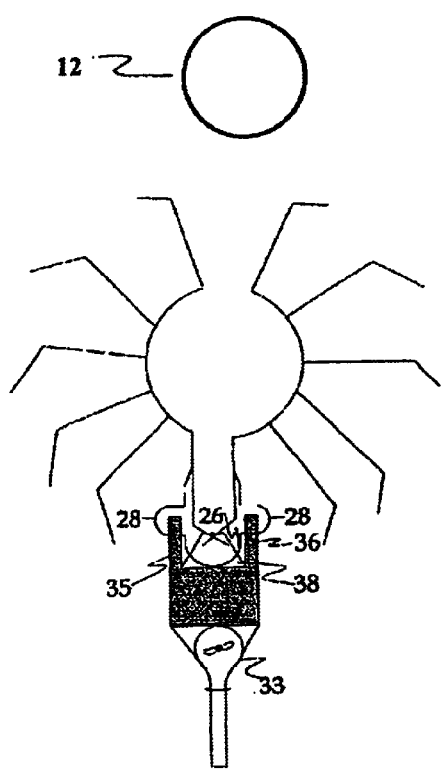
FIG. 6c is an illustration of the installation bracket of the present invention engaging the animal guard and installation stick and prior to installation on the animal guard on the transformer bushing.
Figure 6D:
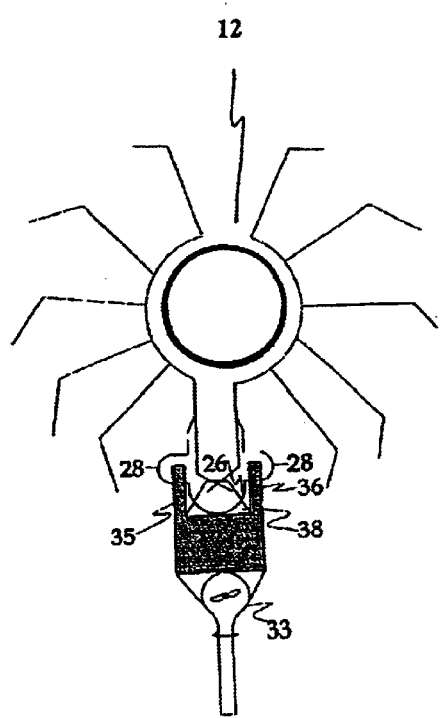
FIG. 6d is an illustration of the installation bracket of the present invention engaging the animal guard and installation stick and immediately after installation of the animal guard on the transformer bushing.

FIG. 6c shows the configuration of the animal guard bracket engaging both the animal guard and installation stick prior to installation of the animal guard on the transformer bushing 12. In the installation process, the installer will use the installation stick to raise the animal guard to the appropriate level corresponding to the transformer bushing. The installer would then position the animal bracket such that the bracket opening 30 faces the transformer bushing. The installer moves the animal guard such that the guard opening receives the transformer bushing. FIG. 6d shows the animal guard engaging the transformer bushing 12. At this point, the installer would disengage the animal guard from the bracket.

Figure 7:
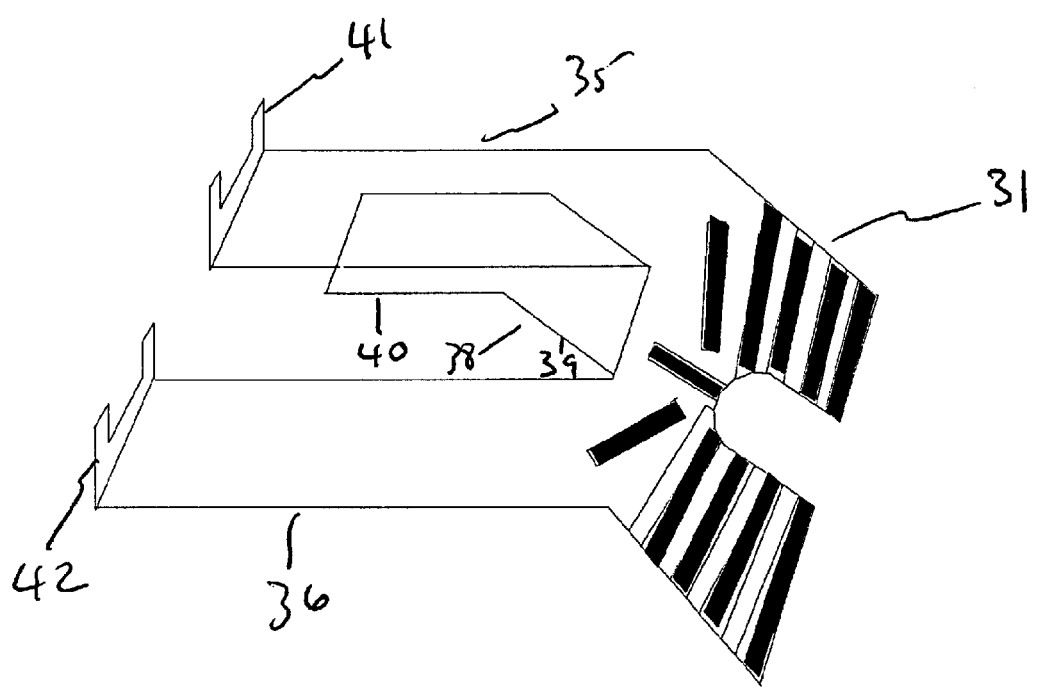
FIG. 7 is an alternate implementation of the present invenvtion.

FIG. 7 shows the implementation of the guide in an inverted position relative to FIG. 2. In this implementation, the pole engager 31 extends downward. The tongue section 38 extends upward and engages the animal guard. The tongue section extends over the guard and the arms 35 and 36 extend under the guard. Ends 41 and 42 extend upward to further secure the guard to the bracket.

The frame of the installation bracket may take the form of aluminum plated, fiberglass or other suitable material for a frame. A large notch is connected as part of the frame and is angled in a downward orientation. Two small notches are connected to the frame in an upward direction at an angle of 90 degrees to the frame. A metal tab is connected as part of the frame and has an angular type orientation parallel to the frame body.

The large notch on the frame may be connected to a pole such as a telescopic hot stick or other means used to lift the animal guard and bracket during the installation process. The two small notched on the present invention frame connect to the animal guard base. The notches create a means of lifting and supporting the animal guard when in motion toward the insulator, bushing, surge arrester or equipment.

The metal tab connected to the frame in an angular orientation acts as a stabilized brace to prevent rotation of the animal guard when in motion toward the insulator, bushing, surge arrester or equipment.

It is important to note that while the present invention has been described in the context of the preferred embodiment for construction and use of the device. The animal guard can have various designs. Therefore, there can be various designs to the animal bracket of the present invention to accommodate these animal guard designs. Those skilled in the art will appreciate the alternate embodiments of the present invention. Those skilled in the art will also appreciate and recognize that there may be ways to improve upon the design and implementation of the device of the present invention. Therefore, it is not desired to limit the invention to the specific construction and implementations described and shown herein. Accordingly, those skilled in the art may make changes and modifications to the device of the present invention that are within the spirit and scope of the present invention as described in this document. The present embodiment is, therefore, to be considered as merely illustrative and not restrictive. The scope of the invention is indicated by the claims that follow rather than the foregoing description, and all changes, which come within the meaning and range of equivalence of the claims, are therefore intended to be embraced therein.

We claim:

1. An animal guard installation device for installing an animal guard at an elevated location from ground level, said animal guard installation device having a plate-like frame and comprising:

a first end of the frame for engaging a lifting device that will lift the animal guard and installation device to the desired installation location, said first end having a notch into which the lifting device will pass to enable the frame to engage the lifting device;

a second end of the frame for engaging the animal guard, said second end having downward extending members to engage portions of the animal guard;

a tab member angularly extending downward from said first end of the frame, said tab member capable of engaging the animal guard such that the animal guard is secured to the bracket by said second end of the frame and said tab member.

2. The animal guard installation device as described claim 1 wherein said second end further comprises two separate arm members extending from said first end of the frame to the second end of the frame, each of said arm members having a substantially rectangular shape.

3. The animal guard installation device as described in claim 2 wherein said arm members are connected at said first end of the frame by a bridge section, said bridge section forming the first end of the frame.

4. The animal guard installation device as described in claim 3 wherein said first end of the frame further comprises a plate member extending from said bridge section, said plate member containing the notch for engaging the lifting device.

5. The animal guard installation device as described in claim 4 wherein a hinge connects said plate member to said bridge section.

6. The animal guard installation device as described in claim 4 wherein said plate connects to said bridge section in an angled direction.

7. The animal guard installation device as described in claim 3 wherein said tab member extends downward from said bridge section.

8. The animal guard installation device as described in claim 7 wherein said tab member further comprises a downward angled extension member and a substantially horizontal extending member for engaging the animal bracket.

9. The animal guard installation device as described in claim 7 wherein said tab member extends in a downward angled direction and comprises a curved shape.

10. The animal guard installation device as described in claim 2 wherein the extended end of each arm has a downward extending section, each said downward extending section having a notch to engage the animal guard.

11. The animal guard installation device as described in claim 4 wherein said plate extends from connects to said bridge section in an angled direction.

12. A system for installing an animal guard on electrical equipment at an elevated location from ground level, said animal guard installation device having a plate-like frame and comprising:

lift pole to raise the animal guard to the desired installation location; and an animal guard installation bracket for engaging the animal guard, said bracket having a first end for engaging said lift pole, said first end having a notch into which the lifting pole to will pass to enable said bracket to engage said lifting pole, said bracket further comprising two separate arm members extending from said first end of said bracket for engaging the animal guard, each of said arm members having a substantially rectangular shape, and a tab member angularly extending downward from said first end of the bracket, said tab member capable of engaging the animal guard such that the animal guard is secured to the bracket by said arm members and said tab member; and arm extensions extending from each of said arm members, said arm member extensions connecting to said arm members in a substantially perpendicular manner, said arm member extension engages the animal bracket further securing the animal bracket to the animal guard.

13. A method for installing an animal guard at an elevated location from a ground level position comprising the steps of:

attaching an the animal guard bracket and the animal guard by engaging extension arms of the animal guard bracket with the animal guard, engaging a tab member of the animal guard bracket with the animal guard, engaging a flange member of the animal guard with the extension arms of the animal guard bracket and engaging a spring member of the animal guard with the tab member of the animal guard bracket;

attaching the animal guard bracket to a lifting pole by inserting the lifting pole through a notch in the animal guard bracket;

lifting the animal guard and animal guard installation bracket to the proper installation location level; and inserting an open end of the animal guard around the electrical equipment.

14. A method for installing an animal guard at an elevated location from a ground level position comprising the steps of:

attaching an the animal guard bracket and the animal guard by engaging extension arms of the animal guard bracket with the animal guard, engaging a tab member of the animal guard bracket with the animal guard, engaging a flange member of the animal guard with the extension arms of the animal guard bracket and engaging a flange member of the animal guard with downward extensions from the arm extensions of the animal guard bracket to further secure the animal guard bracket;

attaching the animal guard bracket to a lifting pole by inserting the lifting pole through a notch in the animal guard bracket;

lifting the animal guard and animal guard installation bracket to the proper installation location level; and inserting an open end of the animal guard around the electrical equipment.

* * * * *